US011221686B2

(12) United States Patent
Nakayama et al.

(10) Patent No.: US 11,221,686 B2
(45) Date of Patent: Jan. 11, 2022

(54) MULTIFUNCTION PEN

(71) Applicant: MITSUBISHI PENCIL COMPANY, LIMITED, Tokyo (JP)

(72) Inventors: Kyo Nakayama, Tokyo (JP); Shinichi Ushiku, Tokyo (JP); Tsuyoshi Nishida, Tokyo (JP); Masashi Sakagami, Tokyo (JP); Satoru Okabe, Tokyo (JP); Yusuke Koizumi, Tokyo (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/766,907

(22) PCT Filed: Oct. 24, 2018

(86) PCT No.: PCT/JP2018/039556
§ 371 (c)(1),
(2) Date: May 26, 2020

(87) PCT Pub. No.: WO2019/107024
PCT Pub. Date: Jun. 6, 2019

(65) Prior Publication Data
US 2020/0363881 A1    Nov. 19, 2020

(30) Foreign Application Priority Data

Nov. 28, 2017   (JP) .............................. JP2017-228202

(51) Int. Cl.
*G06F 3/0354*   (2013.01)
*B43K 24/12*    (2006.01)
(Continued)

(52) U.S. Cl.
CPC .......... *G06F 3/03545* (2013.01); *B43K 24/12* (2013.01); *B43K 27/00* (2013.01); *B43K 29/08* (2013.01)

(58) Field of Classification Search
CPC ....... B43K 24/12; B43K 24/163; B43K 29/08
See application file for complete search history.

(56) References Cited

U.S. PATENT DOCUMENTS 8,322,937 B2 *  12/2012  Imamura ................ B43K 27/12
                                                401/1
10,052,906 B2 *  8/2018  Cheon .................... B43K 27/12
(Continued)

FOREIGN PATENT DOCUMENTS

JP        2013-95016 A    5/2013
WO        2016/121478 A1  8/2016
(Continued)

OTHER PUBLICATIONS

International Search Report dated Dec. 4, 2018, issued in counterpart application No. PCT/JP2018/039556, w/English translation (2 pages).

(Continued)

*Primary Examiner* — David P Angwin
*Assistant Examiner* — Bradley S Oliver
(74) *Attorney, Agent, or Firm* — Westerman, Hattori, Daniels and Adrian, LLP

(57) ABSTRACT

A multifunction pen includes plural refills including an electromagnetic induction touch pen. A knock operation to one of knock rods each of which is connected to a rear end of each of the plural refills causes a tip of one refill of the plural refills to move from a standby position in which the tip stays inside a shaft tube to an in-use position in which the tip projects from a tip end opening of the shaft tube. At least one refill from writing refills other than the electromagnetic induction touch pen is provided with a metal writing tip, and a tip of the electromagnetic induction touch pen at the in-use position is separated from the tips of the writing refills at the standby position by a distance such that electromagnetic (Continued)

induction by the electromagnetic induction touch pen is not affected by the tips of the writing refills.

8 Claims, 21 Drawing Sheets

(51) Int. Cl.
    *B43K 27/00*     (2006.01)
    *B43K 29/08*     (2006.01)

(56) References Cited

U.S. PATENT DOCUMENTS

| | | | |
|---|---|---|---|
| 10,507,685 B2* | 12/2019 | Tsukioka | B43K 21/22 |
| 10,739,872 B2* | 8/2020 | Kamiyama | B43K 27/08 |
| 2018/0181223 A1* | 6/2018 | Yamada | G06F 3/0383 |
| 2020/0247174 A1* | 8/2020 | Arminak | B43K 27/006 |
| 2021/0031557 A1* | 2/2021 | Nakayama | B43K 24/04 |

FOREIGN PATENT DOCUMENTS

| | | | |
|---|---|---|---|
| WO | 2016/129614 A1 | 8/2016 | |
| WO | 2017/043214 A1 | 3/2017 | |

OTHER PUBLICATIONS

Written Opinion dated Dec. 4, 2018, issued in counterpart application No. PCT/JP2018/039556 (5 pages).

* cited by examiner

MULTIFUNCTION PEN

TECHNICAL FIELD

The present invention relates to a multifunction pen.

BACKGROUND ART

Recently, pointing devices such as digitizers are widely used to perform input by physically contacting a screen. Namely, a contact position of a position indicator formed in the shape of a pen is detected when contacting an input screen of a tabular input device provided with a position detection device.

Such digitizers employ various methods, including electromagnetic induction methods. This is a method in which an electromagnetic induction coil is provided at the position indicator so as to resonate in response to electromagnetic waves of a specific frequency generated by the position detection device installed behind the input screen of the input device, and the position at which this resonance occurs is interpreted as an input position.

WO No. 2016/121478 A1 and WO No. 2016/129614 A1 describe such technology.

SUMMARY OF INVENTION

Technical Problem

WO No. 2016/121478 A1 and WO No. 2016/129614 A1 disclose so-called multifunction pens in which an electromagnetic induction-type electronic pen core is housed in a shaft tube together with a ballpoint pen core. In such multifunction pens, a knock operation is used to switch which of the electronic pen core or the ballpoint pen core protrudes and retracts from a tip end opening of the shaft tube.

Note that in the electromagnetic induction-type electronic pen core, when the electromagnetic induction coil resonates in response to electromagnetic waves of a specific frequency as described above, if metal components (for example, a ballpoint pen tip of a writing implement) are present, this may interfere with the magnetic field, affecting the electromagnetic induction.

Accordingly, aspects of the present invention concern a multifunction pen in which refills configured by both an electromagnetic induction touch pen and a writing refill are present together in a shaft tube, and a metal portion of the writing refill does not affect electromagnetic induction in a standby position during use of the electromagnetic induction touch pen.

Solution to Problem

(1) First Aspect

In consideration of the above circumstances, a first aspect of the present invention is a multifunction pen including plural refills provided inside a shaft tube, the plural refills including a refill configured by an electromagnetic induction touch pen, and knock rods each of which is connected to a rear end of each of the plural refills such that a forward knock operation of one of the knock rods causes a tip of one refill of the plural refills to move from a standby position in which the tip stays inside the shaft tube to an in-use position in which the tip projects from a tip end opening of the shaft tube. At least one refill of the plural refills other than the electromagnetic induction touch pen, which are writing refills, provided with a metal writing tip. A tip of the electromagnetic induction touch pen at the in-use position is separated from the tip of the at least one writing refill at the standby position by a distance such that electromagnetic induction by the electromagnetic induction touch pen is not affected by the tip of the writing refill.

Experimentation by the applicant has confirmed that electromagnetic induction is impeded when the distance between an electromagnetic induction touch pen and a ballpoint pen refill serving as a writing refill does not achieve a separation of at least 15 mm, and preferably at least 20 mm, when the electromagnetic induction touch pen of the multifunction pen is in the in-use position. This is thought to be due to metallic materials employed in the ballpoint pen refill interfering with a ferrite core provided to the electromagnetic induction touch pen and affect the electromagnetic induction. Accordingly, preferably a distance of at least 15 mm is achieved so as not to affect electromagnetic induction by the electromagnetic induction touch pen as described above.

Note that the writing refill of the present aspect refers to a refill housed in the multifunction pen other than the electromagnetic induction touch pen, and is a concept not limited to the narrow definition of a writing implement for drawing lines on paper (for example ballpoint pens, mechanical pencils, pencil cores, or thermochromic core marker pens), and also encompasses implements for erasing lines drawn by the writing implement (for example an eraser, a friction body, or the like), as well as writing implements under a broad definition including touch pens (for example pressure-sensitive touch pens and electrostatic capacitance touch pens) employed for virtual writing and other input using a touch panel not employing an electromagnetic induction method. This broadly defined writing implement is packaged as a refill and housed in the shaft tube as the writing refill.

The "in-use position" for the refills refers to a position of the refill that enables writing or input to be performed using the refill, and whether or not writing or input is currently being performed is irrelevant.

(2) Second Aspect

A multifunction pen according to a second aspect of the present invention is the first aspect, wherein the shaft tube includes guide rails along which the knock rods slide in an axial direction accompanying the knock operation. Each of the knock rods therein includes a sliding face configured to slide against a guide rail, a knock projection projecting outward from the sliding face and extending further rearward than a rear end of the sliding face, a rear end anchor portion configured by a step between the rear end of the sliding face and the knock projection and configured to anchor to a front end of the guide rail when the corresponding refill is at the in-use position, a rear end release cam projecting toward an axial center from a vicinity of the rear end of the sliding face and positioned further forward than the front end of the guide rail when the corresponding refill as at the in-use position, and a front end release cam projecting toward an axial center from the sliding face further forward than the rear end release cam, and configured to abut a rear end release cam of a knock rod corresponding to another refill already at the in-use position as the corresponding refill moves from the standby position to the in-use position. A guide rail along which a knock rod of the electromagnetic induction touch pen slides is shorter than a guide rail along which a knock rod of the writing refill slides. A position of a front end of a front end release cam of the knock rod corresponding to the electromagnetic induction touch pen at the standby position is substantially aligned with a position of a front end of the guide rail corresponding to the writing refill. A position of a front end of a front end release cam of the knock rod corresponding to the writing refill at the standby position is substantially aligned with a position of a front end of the guide rail corresponding to the electromagnetic induction touch pen. The tip of the electromagnetic induction touch pen at the standby position is positioned further toward a front end than a tip of the writing refill also at the standby position.

The lengths of the guide rails correspond to the distance of the corresponding refill knock stroke, namely the distance over which that refill has to move from the standby position to reach the in-use position.

Namely, since the guide rail the electromagnetic induction touch pen slides along is relatively short, the tip thereof is able to reach the in-use position with a relatively short knock stroke. Conversely, since the overall length of the writing refill is relatively short and the guide rail along which the writing refill slides is relatively long, the tip of the writing refill reaches the in-use position with a relatively long knock stroke. Accordingly, since the knock strokes of the electromagnetic induction touch pen and the writing refill are different from each other, a user is able to discern by sensation which of the refill knock rods has been operated.

Note that the expression "substantially aligned" in this aspect does not require the positions to be precisely aligned, and substantial alignment with some positional error is also acceptable.

(3) Third Aspect

A multifunction pen according to a third aspect of the present invention is the second aspect, wherein the guide rails are formed as steps set back toward the axial center from a surface of the shaft tube at both inner sides of guide holes configured by elongated holes running along the axial direction. Guide grooves are provided running along the axial direction between the respective guide rails, and the rear end release cams and the front end release cams are inserted through a corresponding guide groove so as to be capable of moving along the axial direction.

Moreover, it is desirable for the guide rails to be provided to a substantially tube shaped guide tube housed inside the shaft tube.

(4) Fourth Aspect

A multifunction pen according to a fourth aspect of the present invention is either the second aspect or the third aspect, wherein a knock projection of the knock rod connected to the electromagnetic induction touch pen has a different shape from a shape of a knock projection of the knock rod connected to the writing refill.

Since the knock projections of the electromagnetic induction touch pen and the writing refill have different shapes from each other in the above configuration, a user is able to discern by touch alone whether or not the refill on which they are attempting a knock operation is the electromagnetic induction touch pen.

(5) Fifth Aspect

A multifunction pen according to a fifth aspect of the present invention is any one of the first, second, third, or fourth aspect, wherein the writing refill includes a thermochromic core refill provided with a thermochromic core, and a friction body is provided at a rear end of the shaft tube for erasing a line drawn using the thermochromic core.

Advantageous Effects of Invention

In a multifunction pen in which refills configured by both an electromagnetic induction touch pen and a writing refill are present together in a shaft tube, the above aspects enable a metal portion of the writing refill when in a standby position to be separated from the electromagnetic induction touch pen during use of the electromagnetic induction touch pen by a sufficient distance such that electromagnetic induction is not impeded.

DESCRIPTION OF EMBODIMENTS

Explanation follows regarding an exemplary embodiment of the present invention, with reference to the drawings. In the following explanation, "tip end" refers to a position at a writing tip of a multifunction pen 1, and "rear end" refers to the opposite thereto. The "front end side" refers to the side toward the "tip end", whereas the "rear end side" refers to the side toward the "rear end".

(1) External Appearance

Figure 1A:
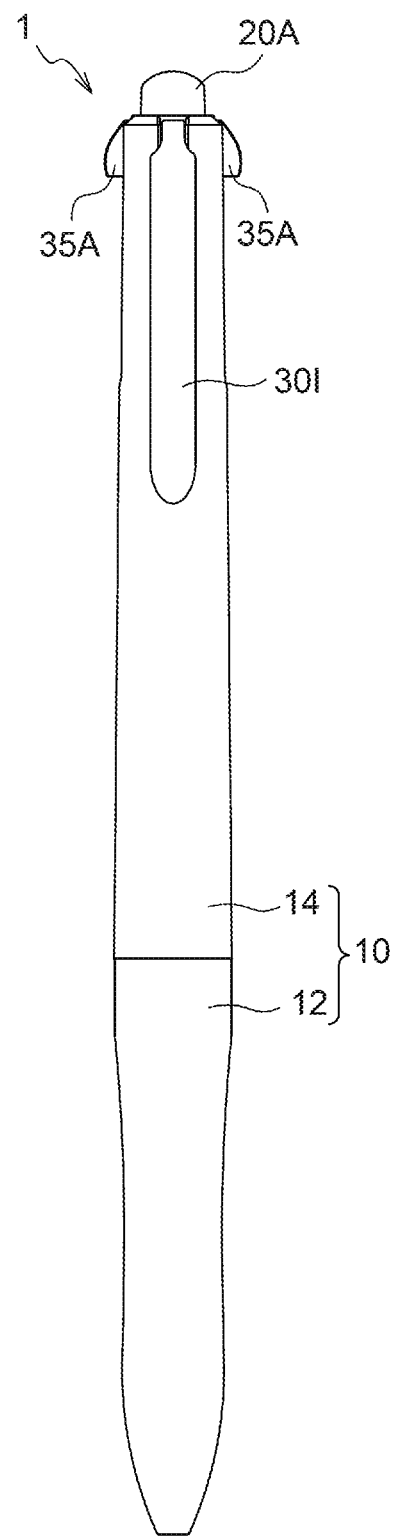
FIG. 1A is a front view illustrating a multifunction pen according to an exemplary embodiment of the present invention when all refills are in a standby position.
Figure 1B:
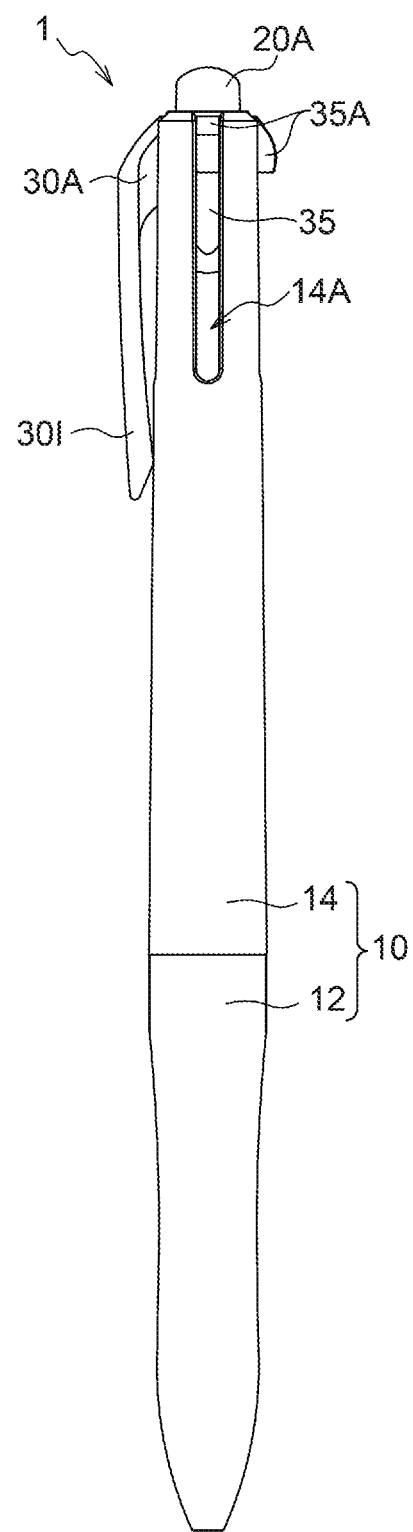
FIG. 1B is a side view illustrating a multifunction pen according to an exemplary embodiment of the present invention when all refills are in a standby position.
Figure 1C:
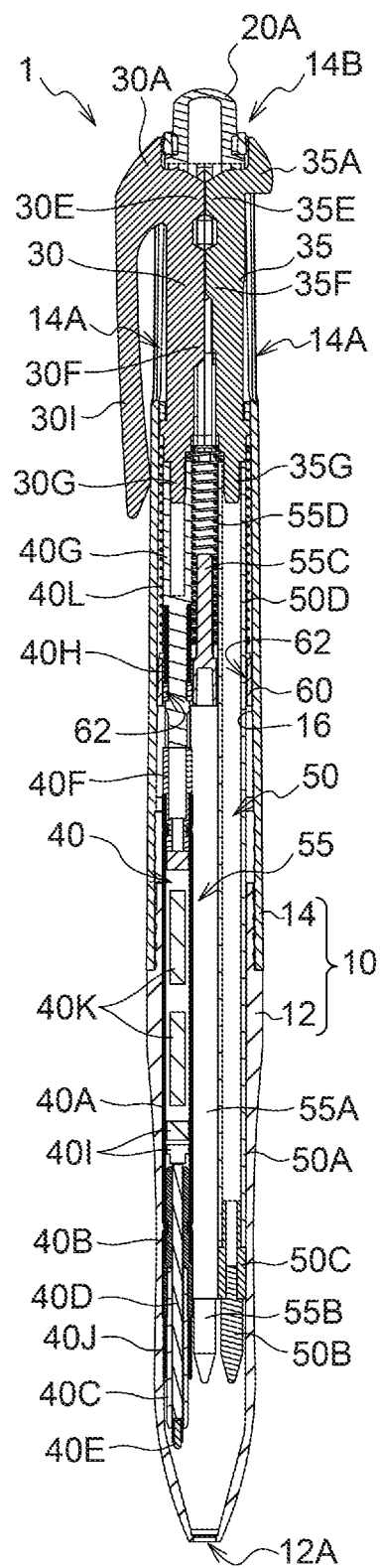
FIG. 1C is a side view cross-section illustrating a multifunction pen according to an exemplary embodiment of the present invention when all refills are in a standby position.

FIG. 1A to FIG. 1C are respectively a front view (FIG. 1A), a side view (FIG. 1B), and a side view cross-section (FIG. 1C) illustrating the multifunction pen 1 according to an exemplary embodiment of the present invention, illustrated when plural refills including a refill configured by an electromagnetic induction touch pen 40 are all in a standby position so as to be held inside a shaft tube 10.

The shaft tube 10, provided with openings at both a tip end and a rear end, is provided as an external structure of the multifunction pen 1 according to the present exemplary embodiment. The shaft tube 10 is formed by screwing together a rear shaft 14 positioned toward the rear end side and a tip shaft 12 positioned toward the front end side. A tip end opening 12A through which tips of the housed refills are able to protrude and to retreat is formed at a tip of the tip shaft 12 (see FIG. 1C). A rear end opening 14B through which a friction body 20A provided at a rear end of a guide tube 20, described later, is exposed is formed in a rear end of the rear shaft 14 (see FIG. 1C).

A total of four guide holes 14A configured by elongated holes running in an axial direction are disposed evenly at the rear end side of the rear shaft 14. Knock projections 35A of a total of three knock rods 35 fitted to the rear of writing refills 50, 55, and a clip 30I integrally formed to a knock projection 30A of a knock rod 30 fitted to the rear of the electromagnetic induction touch pen 40, are exposed through the respective guide holes 14A. The knock rods 30, 35 are capable of moving toward the front and rear along their corresponding guide holes 14A.

(2) Internal Structure

A total of four refills, namely two writing refills 50 serving as ballpoint pen refills (only one of which can be seen in the cross-section of FIG. 1C), a writing refill 55 serving as a thermochromic core refill, and the electromagnetic induction touch pen 40, are housed inside the shaft tube 10. The overall length of the electromagnetic induction touch pen 40 is approximately 7 mm longer than the overall lengths of the other writing refills 50, 55. Accordingly, in a state in the standby position inside the shaft tube 10 in the present exemplary embodiment, the tip of the electromagnetic induction touch pen 40 is positioned approximately 7 mm further forward end than the tips of the other writing refills 50, 55. The relative length of this position is not limited to approximately 7 mm as long as it is in a range sufficiently further forward end for the electromagnetic induction touch pen 40 to function when in use. Namely, the distance between the writing tip of the electromagnetic induction touch pen 40 and the writing tips of the other writing refills 50, 55 is greater in a state in which the electromagnetic induction touch pen 40 is in use than in a state in which the other writing refills 50, 55 are in use.

A short circular cylinder shaped refill support tube 60 is fitted in the interior of the shaft tube 10 slightly toward the rear of center. The refill support tube 60 is penetrated by a support hole 62 through which the respective refills are inserted so as to be capable of moving toward the front and rear. A front end of the refill support tube 60 is supported by a support ridge 16 projecting inward from an inner peripheral face of the shaft tube 10 slightly to the rear of center of the shaft tube 10.

(2-1) Electromagnetic Induction Touch Pen 40

In the electromagnetic induction touch pen 40 as illustrated in FIG. 1C, a tip end connector 40B is fitted onto the tip end of a metal housing tube 40A. The tip end connector 40B is made of a synthetic resin such as polypropylene or polyacetal and is provided with an inbuilt substantially tube shaped core holder 40C through which a rod-shaped ferrite core 40D is inserted. A contact tip 40E made of a synthetic resin such as polyacetal is fitted at a tip end thereof. The electromagnetic induction touch pen 40 is formed with a longer overall length than the overall length of the writing refills 50. An electromagnetic induction coil 40J is wound around the ferrite core 40D with the tip end connector 40B interposed therebetween. A pressure sensor 40I and a capacitor 40K that are electrically connected to the electromagnetic induction coil 40J are housed in the housing tube 40A. A connection portion 40G connected to the knock rod 30, described later is fitted to a rear end of the housing tube 40A through a substantially circular cylinder shaped rear end connector 40F. A knock spring 40L is fitted around the outer periphery of the connection portion 40G. A front end of the knock spring 40L is supported by a rear end edge of the refill support tube 60, and a rear end of the knock spring 40L is supported by a spring support end 30H of the knock rod 30, described later. The knock rod 30 is thus biased toward the rear with respect to the shaft tube 10. A return spring 40H biasing the housing tube 40A toward the front end is interposed between the rear end connector 40F and the connection portion 40G. The return spring 40H is compressed when the housing tube 40A moves toward the rear due to pressing on the tip end connector 40B. The return spring 40H is also effective in preventing damage from shock, for example when dropped. Note that the electromagnetic induction touch pen 40 is connected to the knock rod 30 using the connection portion 40G so as to be capable of being attached and detached with respect to the knock rod 30. For example, when the contact tip 40E wears down or an internal electronic component becomes faulty, the electromagnetic induction touch pen 40 can easily be replaced with a new one.

The knock rod 30 of the electromagnetic induction touch pen 40 has the external appearance illustrated in FIG. 2A to FIG. 2D. FIG. 2A to FIG. 2D illustrate the knock rod 30 for the electromagnetic induction touch pen 40 by a perspective view (FIG. 2A), a front view (FIG. 2B), a side view (FIG.

Figure 2A:
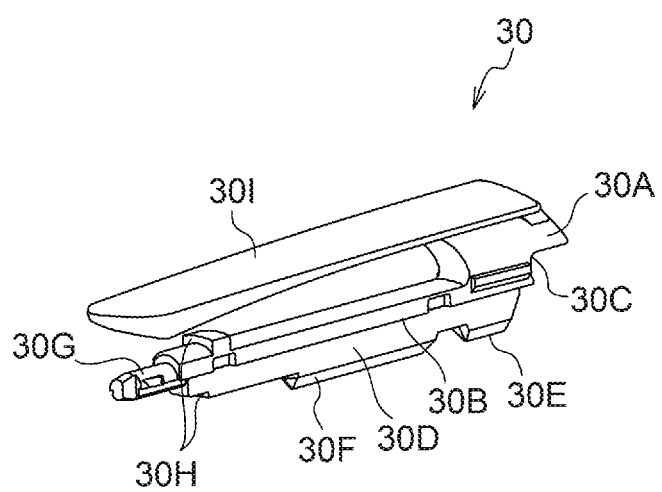
FIG. 2A is a perspective view illustrating a knock rod of an electromagnetic induction touch pen employed in the multifunction pen in FIG. 1A.
Figure 2B:
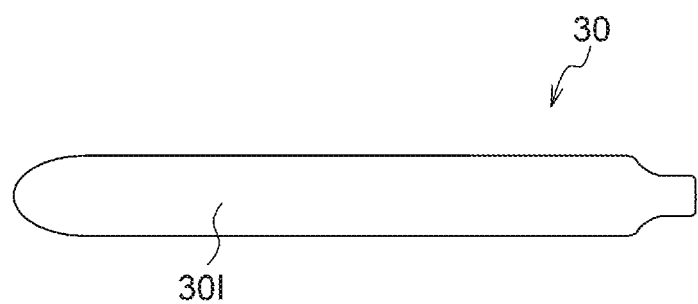
FIG. 2B is a front view illustrating the knock rod of the electromagnetic induction touch pen employed in the multifunction pen in FIG. 1A.
Figure 2C:
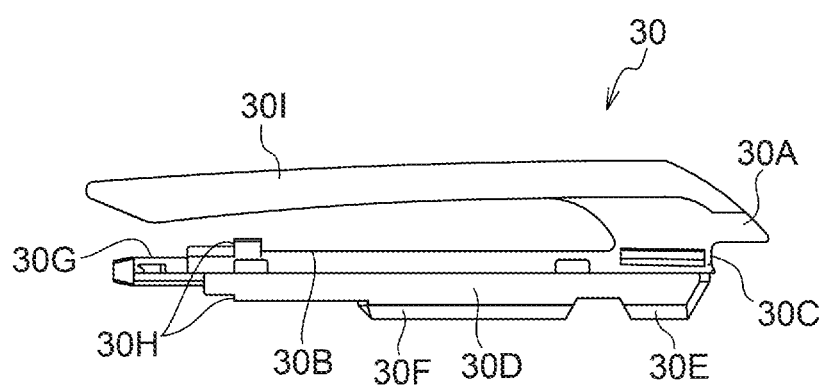
FIG. 2C is a side view illustrating the knock rod of the electromagnetic induction touch pen employed in the multifunction pen in FIG. 1A.
Figure 2D:
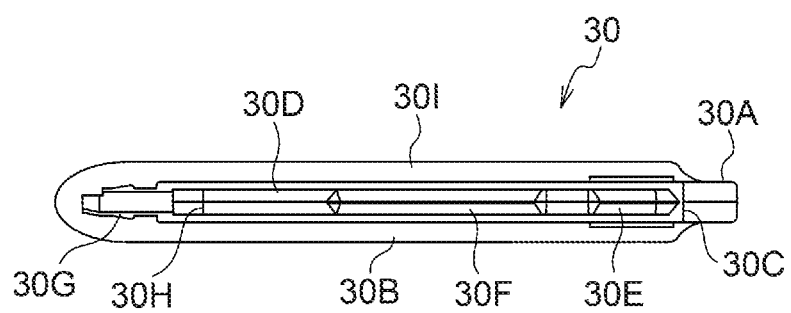
FIG. 2D is a back view illustrating the knock rod of the electromagnetic induction touch pen employed in the multifunction pen in FIG. 1A.

2C), and a back view (FIG. 2D). Note that a "front face side" in FIG. 2A to FIG. 2D refers to the side toward the outer periphery from the axial center of the shaft tube 10, and likewise the "back face side" refers to the side toward the axial center of the shaft tube 10. Reference to directions in the explanation regarding the knock rod 30 in section (2-1) refers to these directions.

A face on the back face side of the knock rod 30 configures a sliding face 30B that slides against guide rails 26, described later (see FIG. 2C). A knock projection 30A projects from the front face side of the knock rod 30 toward the outside of the shaft tube 10 with respect to the sliding face 30B and passes through the corresponding guide hole 14A in the shaft tube 10 to the exterior (see FIG. 1C). The knock projection 30A extends further to the rear than a rear end of the sliding face 30B (see FIG. 2B and FIG. 2C). A step between a rear end of the sliding face 30B and the knock projection 30A configures a rear end anchor portion 30C configured to anchor to a front end of the guide rails 26, described later. A portion of the knock projection 30A extending toward the front end configures the clip 30I. Due to including the clip 30I, the shape of the knock projection 30A of the knock rod 30 connected to the electromagnetic induction touch pen 40 is different from the shape of knock projections 35A of the knock rods 35 connected to the writing refills 50, 55, described later.

A projecting structure configuring a slot-in portion 30D that slots into a guide groove 28, described later, is provided running along the axial direction from the sliding face 30B toward the back face side. A structure projecting further toward the back face side (toward the axial center of the shaft tube 10) and provided in the vicinity of a rear end of the slot-in portion 30D configures a rear end release cam 30E. A structure projecting further to the back face side (toward the axial center of the shaft tube 10) and provided in the vicinity of a front end of the slot-in portion 30D configures a front end release cam 30F. Namely, the rear end release cam 30E and the front end release cam 30F are inserted through the guide groove 28 so as to be capable of moving along the axial direction.

A connection projection 30G to which the electromagnetic induction touch pen 40 is connected projects from a tip end of the knock rod 30. Steps configuring the spring support end 30H are provided slightly to the rear of the connection projection 30G at both a front face side and a back face side thereof. The spring support end 30H supports the rear end of the knock spring 40L described above.

(2-2) Writing Refills 50

As illustrated in FIG. 1C, the writing refills 50 are formed as ballpoint pen refills and each have a structure including a ballpoint pen tip 50B, serving as a metal writing tip, fitted to a tip end of an ink reservoir tube 50A. A connector 50C is interposed between the ink reservoir tube 50A and the ballpoint pen tip 50B. A rear end of the ink reservoir tube 50A is connected to the corresponding knock rod 35, described later. A knock spring 50D is fitted around the outer periphery of the ink reservoir tube 50A in the vicinity of a rear end of the ink reservoir tube 50A so as to bias the knock rod 35 toward the rear. A front end of the knock spring 50D is supported by a rear end edge of the refill support tube 60, and a rear end of the knock spring 50D is supported by a spring support end 35H of the knock rod 35, described later, such that the knock rod 35 is biased toward the rear with respect to the shaft tube 10.

The knock rod 35 of each of the writing refills 50 has the external appearance illustrated in FIG. 3A to FIG. 3D. FIG. 3A to FIG. 3D are a perspective view (FIG. 3A), a front view (FIG. 3B), a side view (FIG. 3C), and a back view (FIG. 3D) of the knock rod 35 for the writing refill 50. Note that the "front face side" in FIG. 3A to FIG. 3D refers to the side toward the outer periphery from the axial center of the shaft tube 10, and likewise the "back face side" refers to the side toward the axial center of the shaft tube 10. Reference to directions in the explanation regarding the knock rod 35 in section (2-2) refers to these directions.

Figure 3A:
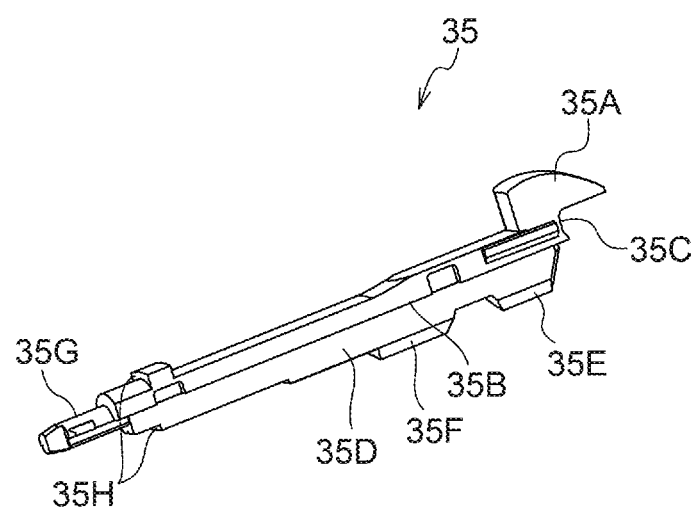
FIG. 3A is a perspective view illustrating a knock rod of a writing refill employed in the multifunction pen in FIG. 1A.
Figure 3B:
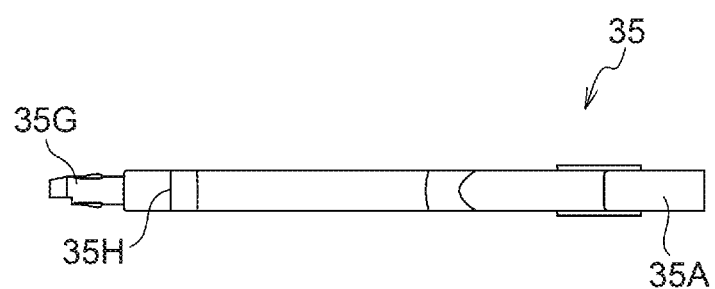
FIG. 3B is a front view illustrating the knock rod of the writing refill employed in the multifunction pen in FIG. 1A.
Figure 3C:
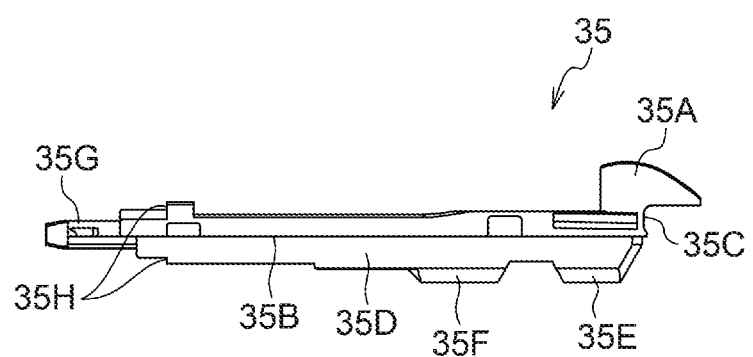
FIG. 3C is a side view illustrating the knock rod of the writing refill employed in the multifunction pen in FIG. 1A.
Figure 3D:
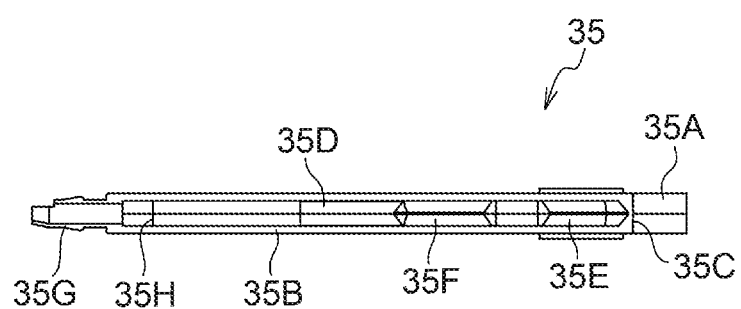
FIG. 3D is a back view illustrating the knock rod of the writing refill employed in the multifunction pen in FIG. 1A.

A face on the back face side of the knock rod 35 configures a sliding face 35B that slides against guide rails 27, described later (see FIG. 3C). A knock projection 35A projects from the front face side of the knock rod 35 toward the outside of the shaft tube 10 with respect to the sliding face 35B and passes through the corresponding guide hole 14A in the shaft tube 10 to the exterior (see FIG. 1C). The knock projection 35A extends further to the rear than a rear end of the sliding face 35B (see FIG. 3B and FIG. 3C). A step between the rear end of the sliding face 35B and the knock projection 35A configures a rear end anchor portion 35C that is configured to anchor to a front end of the guide rails 27, described later.

A projecting structure configuring a slot-in portion 35D that slots into the guide groove 28, described later, is provided running along the axial direction from the sliding face 35B toward the back face side. A structure projecting further toward the back face side (toward the axial center of the shaft tube 10) and provided in the vicinity of a rear end of the slot-in portion 35D configures a rear end release cam 35E. A structure projecting further to the back face side (toward the axial center of the shaft tube 10) and provided in the vicinity of a front end of the slot-in portion 35D configures a front end release cam 35F. Namely, the rear end release cam 35E and the front end release cam 35F are inserted through the guide groove 28 so as to be capable of moving along the axial direction.

A connection projection 35G to which the writing refill 50 is connected projects from a tip end of the knock rod 35. Steps configuring the spring support end 35H are provided at both a front face side and back face side slightly to the rear of the connection projection 35G. The spring support end 35H supports the rear end of the knock spring 50D described above.

Note that the distance from the rear end of the rear end release cam 35E to the front end of the front end release cam 35F in the knock rod 35 of the writing refill 50 is shorter than the distance from the rear end of the rear end release cam 30E to the front end of the front end release cam 30F of the knock rod 30 of the electromagnetic induction touch pen 40 (see FIG. 1C, FIG. 2A to FIG. 2D, and FIG. 3A to FIG. 3D). The significance of this configuration will be described later.

(2-3) Writing Refill 55

As illustrated in FIG. 1C, the writing refill 55 formed as a thermochromic core refill has a structure including a rod shaped thermochromic core 55B housed in a metal core housing tube 55A. A connection portion 55C is fitted to a rear end of the core housing tube 55A in order to connect to the knock rod 35 as described above in section (2-2). A knock spring 55D is fitted around the outer periphery of the connection portion 55C so as to bias the knock rod 35 toward the rear. A front end of the knock spring 55D is supported by a rear end edge of the refill support tube 60, and a rear end of the knock spring 55D is supported by the spring support end 35H of the knock rod 35, such that the knock rod 35 is biased toward the rear with respect to the shaft tube 10. The knock rod 35 to which the writing refill 55 is connected is configured similarly to the knock rod 35 of the writing refill 50 described in detail in section (2-2) above.

In the present exemplary embodiment, the thermochromic core 55B fitted into the writing refill 55 as a thermochromic core refill has thermochromic properties due to containing at least a resin component, a wax component, a thermochromic colorant, and a white extender. The resin component contains at least one of rosin or a modified rosin product in a range of from 0.5% by weight to 20% by weight. The wax component contains at least one of a glycerin fatty acid ester or a pentaerythritol fatty acid ester with a melting point of 45° C. or greater in a range of from 8% by weight to 50% by weight.

In the thermochromic core 55B of the present exemplary embodiment, the rosin or modified rosin product employed as the "resin component" is not particularly limited, and any substance generally classified as a rosin or a modified rosin product may be employed therefor. Abietic acid that is the main component of rosin may also be employed therefor. Note that "modified rosin product" referred to herein refers to glycerin esters of rosin and the like.

The above may be either synthetic or natural products, and may be employed alone or in a mixture of two or more types, appropriately selected according to the target coloration property and hardness of the thermochromic core 55B.

The resin component content is in a range of from 0.5% by weight to 20% by weight. If the resin component content is below 0.5% by weight then this leads to inferior adhesion to smooth surfaces and results in insufficient coloring, and is also impractical due to weak strength. However, when the resin component content exceeds 20% by weight, the hardness increases, leading to inferior adhesion to smooth surfaces again, and resulting in insufficient coloring.

In the thermochromic core 55B of the present exemplary embodiment, the glycerin fatty acid ester employed as the "wax component" is not particularly limited, and any material generally classified as a glycerin fatty acid ester and having a melting point of 45° C. or greater may be employed therefor. For example, a palmitic-acid glyceride, a stearic-acid glyceride, or the like having a melting point of 45° C. or greater may be employed therefor, and monoglycerides, diglycerides, and triglycerides may each be employed therefor. Furthermore, as other materials other than the above, natural products having a main component of a glyceryl fatty acid ester may be employed therefor, including Japan wax such as haze wax, urushi wax, and the like, and sumac waxes such as woodland sumac wax, Japanese sumac wax, and the like.

In the thermochromic core 55B of the present exemplary embodiment, the pentaerythritol fatty acid ester employed as the "wax component" is not particularly limited, and any material generally classified as a pentaerythritol fatty acid ester and having a melting point of 45° C. or greater may be employed therefor. For example, materials having a melting point of 45° C. or higher that may be employed thereof include pentaerythritol palmitate, pentaerythritol stearate, and the like, and monopentaerythritol, dipentaerythritol, tripentaerythritol, and tetrapentaerythritol. Note that if the melting point is below 45° C. then strength becomes too weak for practical use, and the thermochromic core 55B is liable to break when the thermochromic core 55B is molded into a thin core.

The glycerin fatty acid esters and pentaerythritol fatty acid esters that may be employed in the thermochromic core 55B of the present exemplary embodiment may be both synthetic or natural products, and may be employed alone or in a mixture of two or more types appropriately selected according to the target coloration property and hardness of the thermochromic core 55B.

The wax component content is in a range of from 8% by weight to 50% by weight. If the wax component content is below 8% by weight then the thermochromic core 55B becomes hard and this leads to inferior adhesion to smooth surfaces and results in insufficient coloring. However, when the wax component content exceeds 50% by weight this leads to the strength of the thermochromic core 55B become weak and impractical.

The "thermochromic colorant" employed in the thermochromic core 55B of the present exemplary embodiment is, for example, a thermochromic composition configured from at least a leuco dye, a developer, and a color change temperature regulator, including microcapsule pigments encapsulating these materials. From the perspective of reinforcing the wall material in the microcapsule pigments, the wall material of the microcapsule particles is preferably a cross-linkable monomer or polymer or formed from a wall material of a macromolecular resin formed from a polymer compound or the like including a cross-linking material, with the thermochromic composition encapsulated therein.

The leuco dye employed in the thermochromic core 55B of the present exemplary embodiment is not particularly limited as long as it is an electron-donating dye with a coloring function. From the perspective of obtaining excellent coloring characteristics, examples thereof include 3,3-bis (p-dimethylaminophenyl)-6-dimethyl-aminophthalide, 3-(4-diethylaminophenyl)-3-(1-ethyl-2-methylindol-3-yl) phthalide, 3-(4-diethylamino-2-ethoxyphenyl)-3-(1-ethyl-2-methylindol-3-yl)-4-azaphthalide, 1,3-dimethyl-6-diethyl-aminofluoran, 2-chloro-3-methyl-6-dimethylaminofluoran, 3-dibutylamino-6-methyl-7-anilinofluoran, 3-diethylamino-6-methyl-7-anilinofluoran, 3-diethylamino-6-methyl-7-xylidinofluoran, 2-(2-chloroanilino)-6-dibutylaminofluoran, 3,6-dimethoxyfluoran, 3,6-di-n-butoxyfluoran, 1,2-benz-6-diethylaminofluoran, 1-2-benz-6-dibutylaminofluoran, 1,2-benz-6-ethylisoamylaminofluoran, 2-methyl-6-(N-p-tolyl-N-ethylamino)fluoran, 2-(N-phenyl-N-methylamino)-6-(N-p-tolyl-N-etylamino)fluoran, 2-(3'-trifluoromethylanilino)-6-diethylaminofluoran, 3-chloro-6-cyclohexylaminofluoran, 2-methyl-6-cyclohexylaminofluoran, 3-methoxy-4-dodecoxystylinoquinoline, and the like. These may be employed singly (one type) or as a mixture of two or more types thereof (hereafter referred to simply as "at least one type").

Furthermore, a pyridine-based compound, a quinazoline-based compound, a bisquinazoline-based compound, or the like that causes the production of a yellow to red color may also be employed therefor.

The leuco dye here includes a lactone skeleton, a pyridine skeleton, a quinazoline skeleton, a bisquinazoline skeleton, or the like, and is a dye that produces color by ring-opening of these skeletons (rings).

The developer employed in the thermochromic core 55B of the present exemplary embodiment is a developer that causes coloration of a leuco dye. The developer is configured from crystalline particles, and is contained in an ink in this crystalline state.

From the perspective of obtaining an ink having excellent coloring characteristics, specific examples of developers that may be employed include o-cresol, tert-butylcatechol, nonylphenol, n-octylphenol, n-dodecylphenol, n-stearylphenol, p-chlorophenol, p-bromophenol, o-phenylphenol, hexafluorobisphenol, p-hydroxy-n-butyl benzoate, p-hydroxy-n-octylbenzoate, resorcin, dodecyl gallate, 2,2-bis (4'-hydroxyphenyl) propane, 4,4-dihydroxydiphenyl sulfone, 1,1-bis (4'-hydroxyphenyl) ethane, 2,2-bis (4'-hydroxy-3-methylphenyl)propane, bis (4-hydroxyphenyl)sulfide, 1-phenyl-1,1-bis (4'-hydroxyphenyl)ethane, 1,1-bis (4'-hydroxyphenyl)-3-methylbutane, 1,1-bis (4'-hydroxyphenyl)-2-methylpropane, 1,1-bis (4'-hydroxyphenyl)n-hexane, 1,1-bis (4'-hydroxyphenyl)n-heptane, 1,1-bis (4'-hydroxyphenyl)n-octane, 1,1-bis (4'-hydroxyphenyl)n-nonane, 1,1-bis (4'-hydroxyphenyl)n-decane, 1,1-bis (4'-hydroxyphenyl)n-dodecane, 2,2-bis (4'-hydroxyphenyl)butane, 2,2-bis (4'-hydroxyphenyl)ethyl propionate, 2,2-bis (4'-hydroxyphenyl)-4-methylpentane, 2,2-bis (4'-hydroxyphenyl)hexafluoropropane, 2,2-bis (4'-hydroxyphenyl)n-heptane, 2,2-bis (4'-hydroxyphenyl)n-nonane, and the like. At least one type thereof may be employed.

A color change temperature regulator employed in the thermochromic core 55B of the present exemplary embodiment blocks bonding between the leuco dye and the developer in a heat-melted state so as to produce a color-extinguished state. When the color change temperature regulator is re-cooled to its melting point or lower, the color change temperature regulator crystalizes to produce a colored state The color change temperature regulator is able to repeatedly undergo this reversible change about the boundary of the melting point of the color change temperature regulator. Moreover, a color change temperature regulator may be employed that blocks bonding between the leuco dye and the developer in the heat-melted state to produce the color-extinguished state, but does not crystalize at the melting point even when re-cooled to the melting point of the color change temperature regulator, and therefor maintains the color-extinguished state. The later type of color change temperature regulator exhibits quasi-reversible change with hysteresis characteristics and only crystallizes to produce a colored state when the temperature is further lowered to a range of from several degrees to several tens of degrees below the melting point, and repeatedly exhibits the color-extinguished/colored state when re-heated and re-cooled.

Color change temperature regulators that may be employed in the thermochromic core 55B of the present exemplary embodiment are not particularly limited as long as it has the functions described above. Examples thereof include a compound having at least one polar group such as a hydroxyl group, an ester bond, an ether bond, or an amide bond. Specific examples thereof include: saturated fatty acids such as decanoic acid, dodecanoic acid, tetradecanoic acid, pentadecanoic acid, hexadecanoic acid, heptadecanoic acid, octadecanoic acid, nonadecanoic acid, icosanoic acid, docosanoic acid, tetradocosanoic acid, hexadocosanoic acid, octadocosanoic acid, and the like; higher alcohols such as capryl alcohol, lauryl alcohol, myristyl alcohol, cetyl alcohol, stearyl alcohol, behenyl alcohol, isostearyl alcohol, palmitoleyl alcohol, and the like; amides of the above fatty acids and an amine; esters of the above fatty acids and an alcohol; and ethers of the above higher alcohols and glycerin, propylene glycol, and ethylene glycol. Further examples thereof include aromatic compounds such as diphenylpropanedione, dibenzyloxybenzene, diphenoxybenzene, diisopropylnaphthalene, benzylbiphenyl, benzylnaphthyl ether, dibenzyl sulfoxide, dimethylterephthalate, diphenylcarbonate, diphenylsulfone, fluoranthene, fluorene, methylhydroxynaphthalate, phenylhydroxynaphthalate, steranilide, and the like. One or more of the above examples may be employed.

The microcapsule pigment has an average particle diameter of from 0.1 μm to 20 μm. The wall membranes thereof encapsulate the thermochromic composition and are formed from: an amino resin such as an epoxy resin, a polyamide resin, an acrylonitrile resin, a polyurethane resin, a polyurea resin, a urea-formaldehyde-based resin, a melamine-formaldehyde-based resin, a benzo guanamine resin, a butylated melamine resin, a butylated urea resin, a urea-melamine-based resin, or the like; or alternatively from an acrylic resin, a maleic acid resin, a silicone resin, poly vinyl chloride, polychloride vinylidene, polyvinyl acetate, polystyrene, or the like. In addition to these resins, the wall membranes may also be formed from gelatin, starch, gum Arabic, polyacrylic acid sodium, hydroxyethylcellulose, methylcellulose, polyacrylic acid ester, ethylcellulose, acetic acid cellulose, or the like.

In cases in which the "thermochromic colorant" of the thermochromic core 55B of the present exemplary embodiment is a microcapsule pigment, production may be by microencapsulation such that the average particle diameter of the thermochromic composition configured from at least the above leuco dye, developer, and color change temperature regulator is from 0.1 μm to 20 μm.

Examples of methods to form microencapsulation include interfacial polymerization methods, interfacial polycondensation methods, in situ polymerization methods, orifice methods, phase separation from an aqueous solution methods, phase separation from an organic solvent methods, melt-dispersion cooling methods, air suspension coating methods, spray drying methods, and the like, and the method employed may be appropriately selected according to the application.

For example, in phase separation methods from an aqueous solution the leuco dye, the developer, and the color change temperature regulator are heat-melted before being adding to an emulsifier solution and heat-stirred to make a dispersion of oil droplets. Then, for example, a resin raw material or the like capable of forming a wall membrane of an amino resin is employed as the capsule membrane material, and an amino resin solution, or more specifically a methylol melamine aqueous solution, a urea solution, a benzoguanamine solution, or the like, is gradually added to the above dispersion and subsequently caused to react therewith to prepare a dispersion liquid. The dispersion liquid is then filtered to produce the microcapsule pigment having the desired thermochromic properties.

The contained amounts of the leuco dye, developer, and color change temperature regulator vary depending on the type of leuco dye, developer, and color change temperature regulator employed, and depending on the microencapsulation method etc. However the developer is contained at a mass ratio of from 0.1 to 100 with respect to a leuco dye content of 1, and the color change temperature regulator is contained at a mass ratio of from 1 to 100 with respect thereto. Moreover, the capsule membrane material is present at a mass ratio of from 0.1 to 1 with respect to the capsule content.

The microcapsule pigment of the thermochromic core 55B of the present exemplary embodiment may be given pigment color, and a freely selected color-development temperature and color-extinguish temperature by combining the appropriate type and quantity etc. of the above leuco dye, developer, and color change temperature regulator.

In cases in which a microcapsule pigment is employed as the "thermochromic colorant" of the thermochromic core 55B of the present exemplary embodiment, the wall membranes is preferably formed from a resin, and more preferably, from the perspectives of ease of manufacture, storage stability, and writability, the wall membranes are favorably formed from a thermoset resin such as an amino resin including a melamine resin. The thickness of the wall membranes of the microcapsule pigment may be appropriately determined according to the required strength of wall membranes and line density.

In cases in which the "thermochromic colorant" is a microcapsule pigment, from the perspectives of coloration property, color development ability, ease of color extinguishing, and stability, and from the perspective of suppressing adverse effects on the writability, the average particle diameter is preferably from 0.1 µm to 20 µm, and is more preferably from 0.2 µm to 5.0 µm. Note that the "average particle diameter" referred to in the thermochromic core 55B of the present exemplary embodiment is a value obtained by measuring an average particle diameter (arithmetic mean of a volumetric distribution) using a laser diffraction/dispersion particle diameter particle size distribution measurement device (a laser diffraction particle size analyzer MT3000 (manufactured by Nikkiso Co., Ltd.)).

If the average particle diameter is less than 0.1 µm then sufficient line density is not obtained, however, if the average particle diameter exceeds 20 µm then the writability deteriorates, there is a drop in the dispersion stability of the microcapsule pigment, and detachment from the writing surface occurs due to friction. These average particle diameters are accordingly not preferable.

Note that although depending on the microencapsulation method employed, a microcapsule pigment having an average particle diameter in the above range (from 0.1 µm to 20 µm) may be prepared by employing an appropriate combination of agitation conditions when producing the microcapsule pigment using a phase separation from an aqueous solution method or the like.

In the thermochromic core 55B of the present exemplary embodiment, the contained amount of the "thermochromic colorant" is preferably from 5% to 30% by weight with respect to the total ink composition, and is more preferably from 10% to 25% by weight with respect thereto.

If the contained amount of the thermochromic colorant (developer particles) is less than 5% by weight, then the coloring power and color development ability is insufficient, but when the contained amount exceeds 30% by weight this leads to scratching off readily occurring, and so these contained amounts are not preferable.

As well as the "thermochromic colorant" in the thermochromic core 55B of the present exemplary embodiment, other ordinary pigments may be included as colorants. Examples of such pigments include: azo-based organic pigments such as disazo yellow AAA, pyrazolone orange, and the like; cyanine-based organic pigments such as phthalocyanine blue, phthalocyanine green and the like; higher organic pigments such as quinacridone red and the like; dye pigments such as Fanal color and the like; fluorescent pigments; and inorganic pigments such as carbon black, iron black, Bengal red, Prussian blue, and the like.

Any substance that exhibits whiteness may be employed as the "white extender" in the thermochromic core 55B of the present exemplary embodiment, and examples of known extenders include: titanium dioxide, calcium carbonate, kaolin, talc, precipitated barium sulfate, mica, boron nitride, and types of whiskers such as potassium titanate whiskers, basic magnesium sulfate whiskers, and the like.

The "titanium dioxide" referred to here may employ any known titanium dioxide irrespective of being sourced from rutile or anatase. However, for the purpose of drawing darkly and clearly on a transparent sheet surface, such as transparent plastic, glass, or the like, titanium dioxide for catalyst use has a fine particle diameter, resulting in a faintly drawn surface, and so is not preferable for such a purpose. However, such catalyst titanium dioxide is in contrast well suited application in an underline marker in which the underlying medium is visible therethrough, as described below.

Moreover if, for example, no titanium dioxide is added, and only such white extenders are added to compose the thermochromic core 55B having chromatic properties, then this may be utilized as an underline marker for drawing a semi-transparent line in which the underlying medium is visible therethrough, and then a semi-transparent sheet is further employed to cover the drawn lines before copying. The locations where the lines have been drawn are thereby erased in the copy made thereby, resulting in an instant workbook.

In a state in which the writing refill 55 projects from the tip end opening 12A (not illustrated in the drawings), the multifunction pen 1 is able to write lines with thermochromic properties using the thermochromic core 55B projecting from the tip end.

(3) Guide Tube 20

Figure 4A:
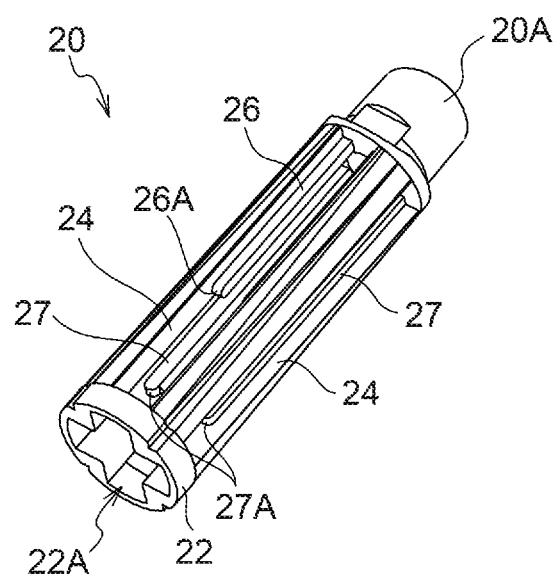
FIG. 4A is a perspective view illustrating a guide tube employed in the multifunction pen in FIG. 1A.
Figure 4B:
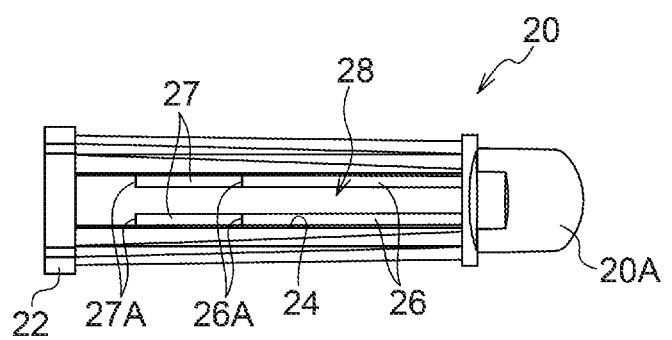
FIG. 4B is a front view illustrating the guide tube employed in the multifunction pen in FIG. 1A.
Figure 4C:
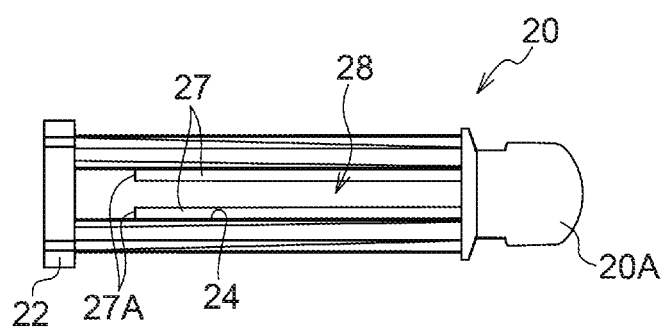
FIG. 4C is a back view illustrating the guide tube employed in the multifunction pen in FIG. 1A.
Figure 4D:
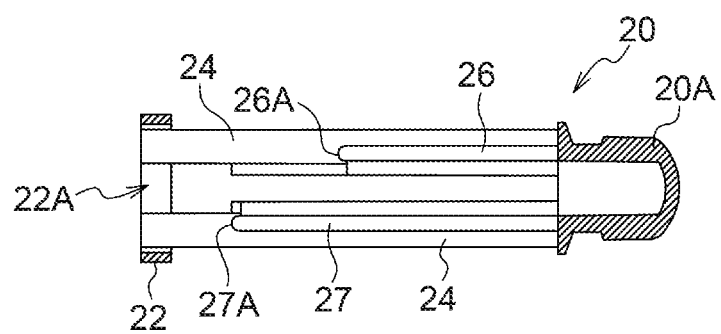
FIG. 4D is a side view cross-section illustrating the guide tube employed in the multifunction pen in FIG. 1A.

The guide tube 20 including the guide rails 26, 27 along which the knock rods 30, 35 slide in the axial direction accompanying a knock operation is housed in the vicinity of the rear end of the interior of the shaft tube 10 of the multifunction pen 1 according to the present exemplary embodiment. The guide tube 20 has a substantially tube shaped external appearance as illustrated in FIG. 4A to FIG. 4D. FIG. 4A to FIG. 4D illustrate the guide tube 20 in a perspective view (FIG. 4A), a front view (FIG. 4B), a back view (FIG. 4C), and a side view cross-section (FIG. 4D).

The guide tube 20 is a substantially circular cylinder shaped member, and the hollow, dome shaped friction body 20A is fitted to a rear end of the guide tube 20. An opening configuring an insertion hole 22A through which the knock rods 30, 35 are inserted is formed through a ring shaped portion 22 positioned at a front end of the guide tube 20. Four side face openings 24 configured by elongated holes extending along the axial direction are disposed evenly around a side face of the guide tube 20. The guide rails 26, 27 are formed in pairs running toward the axial center as steps set back from the surface of the respective side face openings 24. The guide rails 26, 27 configure steps toward the axial center with respect to the surface of the shaft tube 10 on both inner sides of the corresponding guide holes 14A of the shaft tube 10. Among the total of four pairs of the guide rails 26, 27, the knock rod 30 of the electromagnetic induction touch pen 40 slides against a pair thereof having a shorter axial direction length than the others slide, and the knock rods 35 of the writing refills 50, 55 slide against the three other pairs thereof that are comparatively long in the axial direction slide. Front ends of the pair of guide rails 26 with relatively short axial direction length configures anchor ends 26A that anchor the rear end anchor portion 30C of the knock rod 30 of the electromagnetic induction touch pen 40. Front ends of the three pairs of guide rails 26 with comparatively long axial direction length configure anchor ends 27A that anchor the rear end anchor portions 35C of the knock rods 35 of the writing refills 50, 55. The guide grooves 28 are formed along the axial direction between the respective guide rails 26, 27, and as described above, the rear end release cam 30E and the front end release cam 30F of the knock rod 30 of the electromagnetic induction touch pen 40, and the rear end release cam 35E and the front end release cam 35F of the knock rods 35 of the writing refills 50, 55, are inserted through the guide grooves 28 so as to be capable of moving along the axial direction.

Figure 5A:
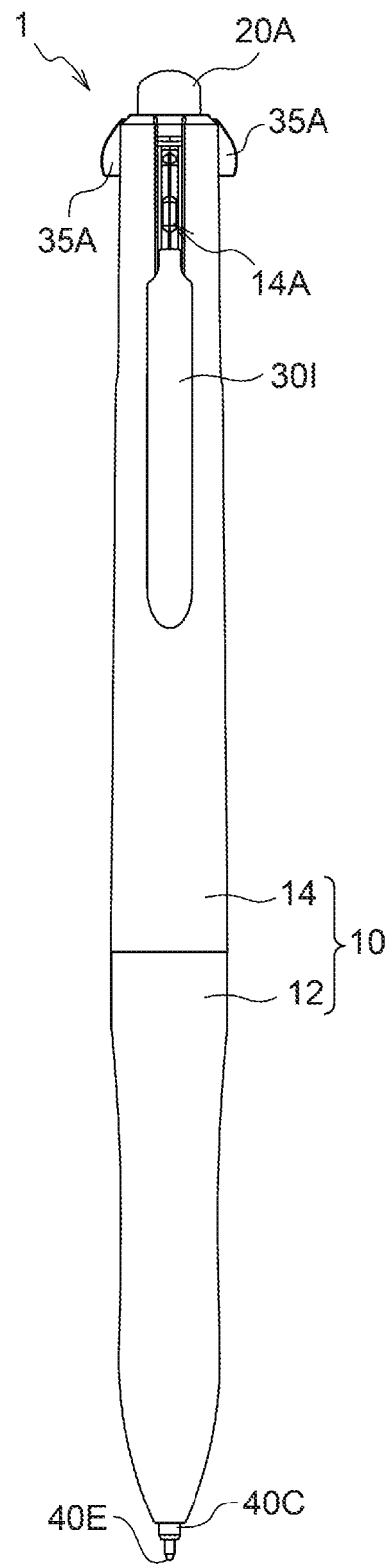
FIG. 5A is a front view illustrating an electromagnetic induction touch pen of a multifunction pen according to an exemplary embodiment of the present invention when in an in-use position.
Figure 5B:
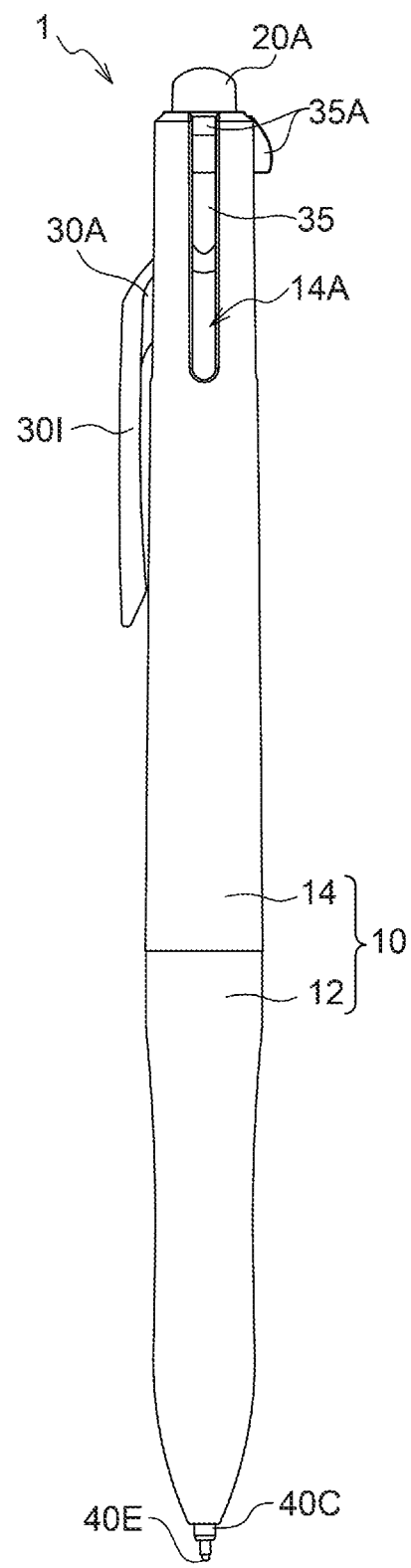
FIG. 5B is a side view illustrating an electromagnetic induction touch pen of a multifunction pen according to an exemplary embodiment of the present invention when in an in-use position.
Figure 5C:
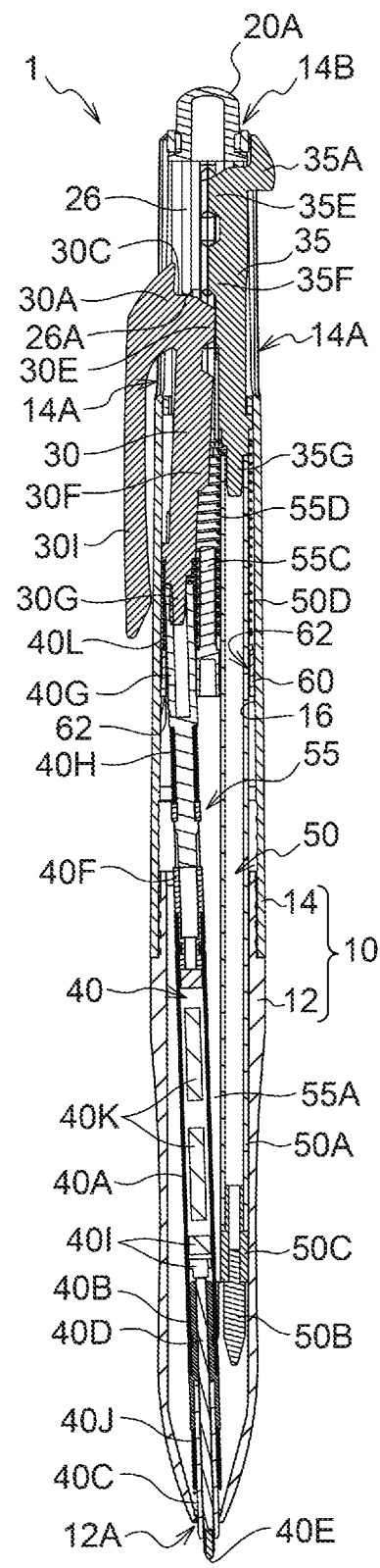
FIG. 5C is a side view cross-section illustrating an electromagnetic induction touch pen of a multifunction pen according to an exemplary embodiment of the present invention when in an in-use position.

Note that the length of the guide rails 26 along which the knock rod 30 of the electromagnetic induction touch pen 40 slides in the axial direction accompanying a knock operation (namely, the knock stroke of the electromagnetic induction touch pen 40) is substantially the same as the distance from the rear end of the rear end release cam 35E to the front end of the front end release cam 35F of the knock rod 35 of the writing refill 50 (see FIG. 5C). The length of the guide rail 27 along which the knock rods 35 of the writing refills 50, 55 slide in the axial direction accompanying a knock operation (namely, the knock stroke of the writing refills 50, 55) is substantially the same as the distance from the rear end of the rear end release cam 30E to the front end of the front end release cam 30F of the knock rod 30 of the electromagnetic induction touch pen 40 (see FIG. 6C).

Even in cases in which the guide rails 26, 27 are not provided to a separate member to the shaft tube 10 as in the guide tube 20 described above, the guide rails 26, 27 may be formed directly to the shaft tube 10, for example as steps set back from the surface of the shaft tube 10.

The friction body 20A has a hollow, dome shaped profile as illustrated in FIG. 4A to FIG. 4D. The friction body 20A employs friction to erase lines drawn using the thermochromic core 55B of the writing refill 55 serving as a thermochromic core refill as described above.

In the present exemplary embodiment, examples of resins that may be employed for the friction body 20A include soft resins (rubbers or elastomers) such as a silicone resin, a styrene-containing resin, a fluorine-based resin, a neoprene resin, a nitrile resin, a polyester-based resin, an ethylene propylene rubber (EPDM), and the like, and hard resins such as a polyacetal resin, a polyethylene resin, a polypropylene resin, an ABS resin, a polycarbonate resin, a polyester resin, and the like. In particular, one of the above hard resins that is a resin with a durometer type A hardness of 60 or greater as defined in JIS K 6253 is preferable employed therefor. If the hardness is less than 60 then the friction body 20A is too soft for friction against the writing trace to generate the friction heat to cause color change. The hardness is preferably from 65 to 100, and more preferably from 70 to 90 in order to enable the color of the writing trace to be reliably changed by friction heat.

(4) Operation

(4-1) Standby Position

As illustrated in FIG. 1C, the overall length of the electromagnetic induction touch pen 40 is approximately 7 mm longer than the overall lengths of the writing refills 50, 55. The axial direction length of the knock rod 30 of the electromagnetic induction touch pen 40 is substantially the same as the axial direction lengths of the knock rods 35 of the writing refills 50, 55. In a state in which all of the refills are in the standby positions, as described above, the tip of the electromagnetic induction touch pen 40 is positioned approximately 7 mm further forward than the tips of the writing refills 50, 55, this being commensurate to the difference between the respective overall lengths. The front end of the front end release cam 30F of the knock rod 30 of the electromagnetic induction touch pen 40 is positioned further forward end than the front ends of the front end release cams 35F of the knock rods 35 of the writing refills 50, 55.

(4-2) Electromagnetic Induction Touch Pen 40 Knock Operation

When a knock operation is performed to move the knock projection 30A (namely the clip 30I) of the electromagnetic induction touch pen 40 from the standby position illustrated in FIG. 1C toward the front (see FIG. 5A and FIG. 5B), the sliding face 30B of the knock rod 30 slides along the corresponding guide rails 26 and the electromagnetic induction touch pen 40 moves toward the front while compressing the knock spring 40L. When the sliding face 30B completes its movement to the front end of the guide rails 26, the electromagnetic induction touch pen 40 completes its movement over the distance corresponding to its knock stroke. As illustrated in FIG. 5C, in a state in which the knock rod 30 has been pushed in toward the axial center, the rear end anchor portion 30C anchors to the anchor ends 26A of the guide rails 26. In this state, the tip of the electromagnetic induction touch pen 40 projects from the tip end opening 12A and moves to an in-use position state. In this state, the tip of the electromagnetic induction touch pen 40 in the in-use position is separated from the tips of the writing refills 50, 55 in standby positions by a distance, specifically at least 15 mm, such that electromagnetic induction by the electromagnetic induction touch pen 40 is not affected thereby. Accordingly, metal portions in the tips of the writing refills 50, 55 do not impede input by the electromagnetic induction touch pen 40 since the electromagnetic induction is not affected thereby.

Note that the positions of the front ends of the front end release cams 35F of the knock rods 35 of the writing refills 50, 55 at the standby position are positions substantially aligned with the positions of the front ends of the guide rails 26. The rear end release cam 30E of the knock rod 30 of the electromagnetic induction touch pen 40 that is already at the in-use position is a position near the axial center immediately in front of the front ends of the guide rails 26. In this state, when a knock operation is performed to the knock projection 35A of the knock rod 35 of one of the writing refills 50, 55, the front end release cam 35F of the knock rod 35 of this writing refill 50, 55 moves toward the front, and abuts and presses the rear end release cam 30E of the knock rod 30 of the electromagnetic induction touch pen 40 positioned immediately in front thereof. When this occurs, the anchoring of the rear end anchor portion 30C to the anchor end 26A is released, and the knock rod 30 of the electromagnetic induction touch pen 40 is pushed back toward the rear as the compressed knock spring 40L returns, such that the electromagnetic induction touch pen 40 returns once again to the standby state illustrated in FIG. 1C.

(4-3) Knock Operation of Writing Refill 50

Figure 6A:
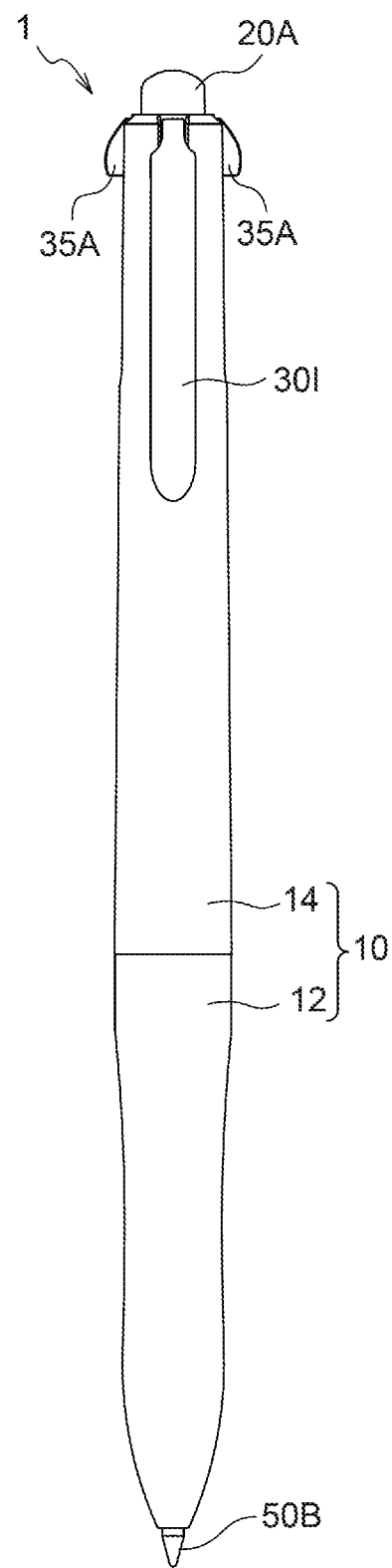
FIG. 6A is a front view illustrating a writing refill of a multifunction pen according to an exemplary embodiment of the present invention when in an in-use position.
Figure 6B:
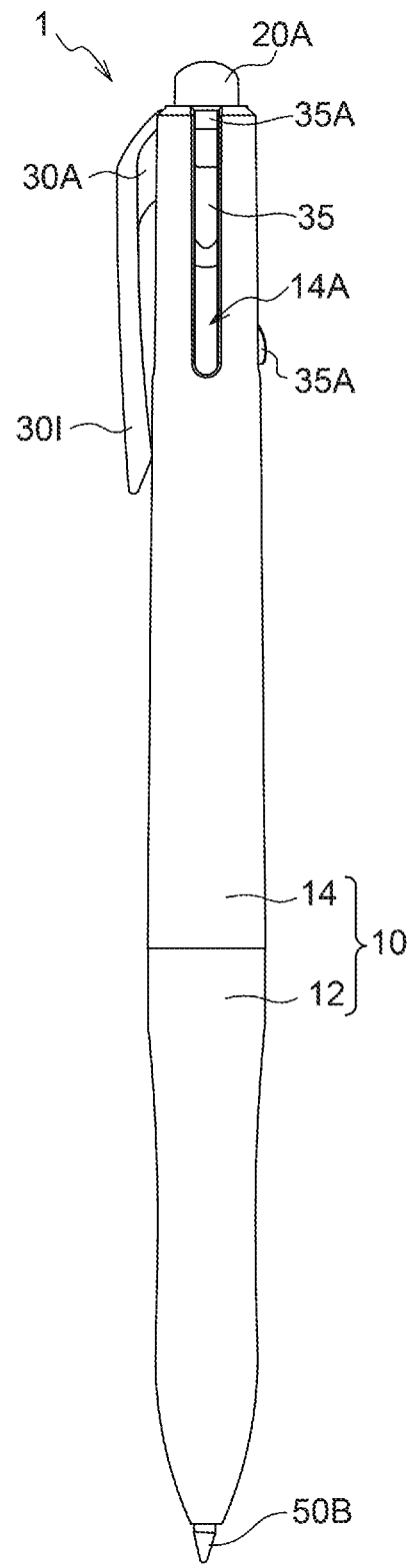
FIG. 6B is side view illustrating a writing refill of a multifunction pen according to an exemplary embodiment of the present invention when in an in-use position.
Figure 6C:
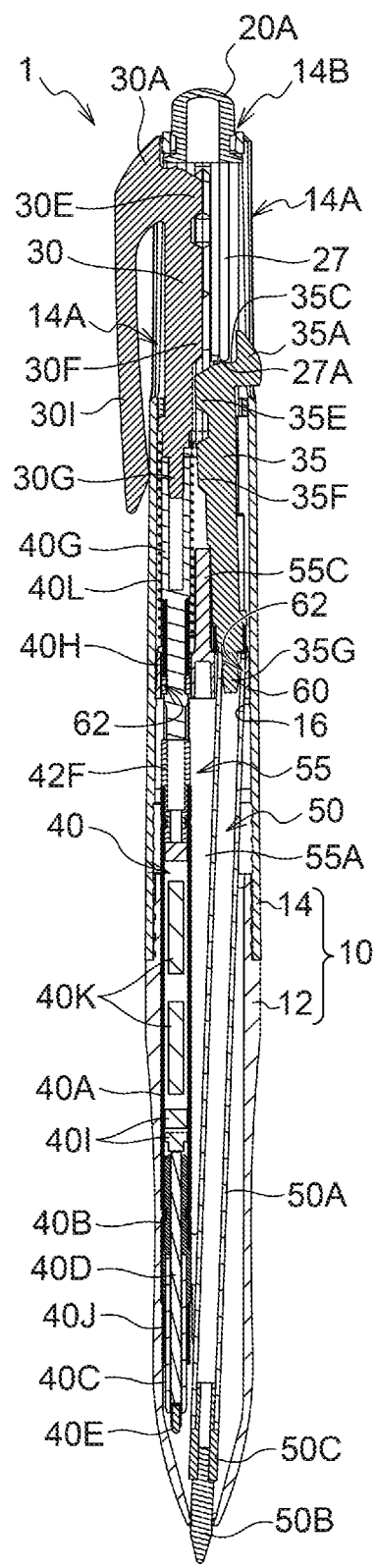
FIG. 6C is a side view cross-section illustrating a writing refill of a multifunction pen according to an exemplary embodiment of the present invention when in an in-use position.

When a knock operation is performed to move the knock projection 35A of one of the writing refills 50 from the standby position illustrated in FIG. 1C toward the front (see FIG. 6B), the sliding face 35B of the knock rod 35 slides along the corresponding guide rails 27 to compress the knock spring 50D such that the writing refill 50 moves toward the front. When the sliding face 35B completes its movement to the front end of the guide rails 27, the writing refill 50 completes movement over the distance corresponding to its knock stroke. As illustrated in FIG. 6C, in a state in which the knock rod 35 has been pushed in toward the axial center, the rear end anchor portion 35C anchors to the anchor ends 27A of the guide rails 27. In this state, the tip of the writing refill 50 projects from the tip end opening 12A and moves to an in-use position state.

Note that the position of the front end of the front end release cam 30F of the knock rod 30 of the electromagnetic induction touch pen 40 at the standby position is a position substantially aligned with the position of the front ends of the guide rails 27. The rear end release cam 35E of the knock rod 35 of the writing refill 50 that is already at the in-use position is a position near the axial center immediately in front of the front ends of the guide rails 27. In this state, when a knock operation is performed on the knock projection 30A of the knock rod 30 of the electromagnetic induction touch pen 40 (namely, the clip 30I), the front end release cam 30F of the knock rod 30 of the electromagnetic induction touch pen 40 moves toward the front, and abuts and presses the rear end release cam 35E of the knock rod 35 of the writing refill 50 positioned immediately in front thereof. When this occurs, the anchoring of the rear end anchor portion 35C to the anchor end 27A is released, and the knock rod 35 of the writing refill 50 is pushed back toward the rear as the compressed knock spring 50D returns, such that the writing refill 50 returns once again to the standby state illustrated in FIG. 1C.

Note that knock operation of the writing refill 55 is similar to that of the writing refills 50 described above.

INDUSTRIAL APPLICABILITY

The present invention is applicable to a multifunction pen.

The invention claimed is:

1. A multifunction pen comprising:
a plurality of refills provided inside a shaft tube, the plurality of refills including a refill configured by an electromagnetic induction touch pen and at least one writing refill which is a refill other than the refill configured by the electromagnetic induction touch pen; and
knock rods each of which is connected to a rear end of each of the plurality of refills such that a forward knock operation to one of the knock rods causes a tip of one refill of the plurality of refills to move from a standby position in which the tip stays inside the shaft tube, to an in-use position in which the tip projects from a tip end opening of the shaft tube;
wherein:
the at least one writing refill is provided with a metal writing tip;
the shaft tube includes guide rails along which the knock rods slide in an axial direction accompanying the knock operation;
a guide rail along which a knock rod of the electromagnetic induction touch pen slides is shorter than a guide rail along which a knock rod of the writing refill slides; and
a tip of the electromagnetic induction touch pen in the in-use position is separated from the tip of the at least one writing refill in the standby position by a distance such that electromagnetic induction by the electromagnetic induction touch pen is not affected by the tip of the writing refill.

2. The multifunction pen of claim 1, wherein:
each of the knock rods includes
a sliding face configured to slide against a guide rail,
a knock projection projecting outward from the sliding face and extending further rearward than a rear end of the sliding face,
a rear end anchor portion configured by a step between the rear end of the sliding face and the knock projection, and configured to anchor to a front end of the guide rail when the corresponding refill is at the in-use position,
a rear end release cam projecting toward an axial center from a vicinity of the rear end of the sliding face and positioned further forward than the front end of the guide rail when the corresponding refill as at the in-use position, and
a front end release cam projecting toward the axial center from the sliding face further forward than the rear end release cam, and configured to abut a rear end release cam of a knock rod corresponding to another refill already at the in-use position as the corresponding refill moves from the standby position to the in-use position;
a position of a front end of a front end release cam of the knock rod corresponding to the electromagnetic induction touch pen at the standby position is substantially aligned with a position of a front end of the guide rail corresponding to the writing refill;
a position of a front end of a front end release cam of the knock rod corresponding to the writing refill at the standby position is substantially aligned with a position of a front end of the guide rail corresponding to the electromagnetic induction touch pen; and
the tip of the electromagnetic induction touch pen at the standby position is positioned further toward a front end than a tip of the writing refill also at the standby position.

3. The multifunction pen of claim 2, wherein:
the guide rails are provided in a substantially tube shaped guide tube housed inside the shaft tube, and are formed as steps set back toward the axial center from a surface of the shaft tube at both inner sides of guide holes configured by elongated holes running along the axial direction;
guide grooves are provided running along the axial direction between the respective guide rails; and
the rear end release cams and the front end release cams are inserted through a corresponding guide groove so as to be capable of moving along the axial direction.

4. The multifunction pen of claim 2, wherein a knock projection of the knock rod connected to the electromagnetic induction touch pen has a different shape from a shape of a knock projection of the knock rod connected to the writing refill.

5. The multifunction pen of claim 1, wherein:
the writing refill includes a thermochromic core refill provided with a thermochromic core; and
a friction body is provided at a rear end of the shaft tube for erasing a line drawn using the thermochromic core.

6. The multifunction of claim 1, wherein:
in a standby position of the multifunction pen, both the tip of the electromagnetic induction touch pen and the tip of the at least one writing refill stay inside the shaft tube, the tip of the electromagnetic induction touch pen being positioned closer to the tip end opening of the shaft tube than the tip of the at least one writing refill.

7. The multifunction pen of claim 6, wherein:
a first knock rod connected to the electromagnetic induction touch pen comprises a first rear end release cam and a first front end release cam, the first front end release cam being positioned further forward than the first rear end release cam,
a second knock rod connected to the at least one writing refill comprises a second rear end release cam and a second front end release cam, the second front end release cam being positioned further forward than the second rear end release cam, and
in the standby position of the multifunction pen, a front end of the first front end release cam is positioned closer to the tip end opening of the shaft tube than a front end of the second front end release cam.

8. The multifunction pen of claim 7, wherein:
the front end of the first front end release cam is separated from a rear end of the first rear end release cam by a first distance,
the front end of the second front end release cam is separated from a rear end of the second rear end release cam by a second distance, and
the second distance is shorter than the first distance.

\* \* \* \* \*